United States Patent
Bates et al.

(10) Patent No.: US 7,058,701 B1
(45) Date of Patent: Jun. 6, 2006

(54) TIME-BASED BROWSER TOOLBAR CONFIGURATIONS ACCORDING TO AT LEAST TWO PREDEFINED TIME-BASED BROWSING SETTINGS

(75) Inventors: Cary Lee Bates, Rochester, MN (US); Mahdad Majd, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 09/630,976

(22) Filed: Aug. 2, 2000

(51) Int. Cl.
*G06F 15/177* (2006.01)

(52) U.S. Cl. .................. 709/220; 709/203; 709/219; 709/223; 715/739

(58) Field of Classification Search ............ 709/203, 709/220, 221, 223, 224, 217, 219; 345/349, 345/357, 378, 854; 715/738, 739
See application file for complete search history.

(56) References Cited

U.S. PATENT DOCUMENTS

| | | | | |
|---|---|---|---|---|
| 5,949,419 A | * | 9/1999 | Domine et al. | 345/744 |
| 5,963,964 A | * | 10/1999 | Nielsen | 715/501.1 |
| 5,970,230 A | * | 10/1999 | Huck | 709/224 |
| 6,057,834 A | * | 5/2000 | Pickover | 345/846 |
| 6,313,835 B1 | * | 11/2001 | Gever et al. | 345/846 |
| 6,510,461 B1 | * | 1/2003 | Nielsen | 709/224 |
| 6,526,424 B1 | * | 2/2003 | Kanno et al. | 715/512 |
| 2002/0120676 A1 | * | 8/2002 | Biondi et al. | 709/203 |
| 2003/0003975 A1 | * | 1/2003 | Lynn | 463/1 |
| 2003/0030679 A1 | * | 2/2003 | Jain | 345/854 |
| 2003/0080993 A1 | * | 5/2003 | Baker | 345/738 |

FOREIGN PATENT DOCUMENTS

JP     2001325167 A    * 11/2001

OTHER PUBLICATIONS http://www1.sympatico.ca/help/software/Microsoft/IE5/customize.html, "Customizing the Subscription Schedule".*

* cited by examiner

*Primary Examiner*—Saleh Najjar
*Assistant Examiner*—Oanh Duong
(74) *Attorney, Agent, or Firm*—Patterson & Sheridan

(57) ABSTRACT

The present invention generally provides a method, article of manufacture and apparatus for establishing time-based browser configurations. A browser is configured according to predetermined parameters when a time-condition is satisfied.

19 Claims, 7 Drawing Sheets

TOOLBAR SETTINGS - 139C

| 502 | 504 | 506 |
|---|---|---|
| DAY OF WEEK | TIME RANGE | TOOLBAR CONFIG |
| MONDAY | 7:00-8:00 | FRENCH1 CLASS |
| MONDAY | 8:00-9:00 | ALGEBRA CLASS |
| MONDAY | 13:00-15:00 | PERIOD1 |
| MONDAY | 19:00-21:00 | MUSIC CLASS |

HOME PAGE - 139A

| DAY OF WEEK | TIME RANGE | HOMEPAGE ADDRESS |
|---|---|---|
| MONDAY | 7:00-8:00 | WWW.FRENCH.COM |
| MONDAY | 8:00-9:00 | WWW.ALGEBRA.COM |
| MONDAY | 13:00-15:00 | WWW.PERIOD1.COM |
| MONDAY | 19:00-21:00 | WWW.MUSIC.COM |

*Fig. 3*

BOOKMARKS - 139B

| DAY OF WEEK | TIME RANGE | BOOKMARKS |
|---|---|---|
| MONDAY | 7:00-8:00 | WWW.FRENCH.COM |
| MONDAY | 7:00-8:00 | WWW.BONJOUR.NET |
| MONDAY | 7:00-8:00 | WWW.LESSON.ORG |
| MONDAY | 7:00-8:00 | WWW.LEARN.ORG |
| MONDAY | 8:00-9:00 | WWW.ALGEBRA.COM |
| MONDAY | 13:00-15:00 | WWW.IBMCLASS.NET |
| MONDAY | 19:00-21:00 | WWW.GUITAR.COM |

*Fig. 4*

TOOLBAR SETTINGS - 139C

| DAY OF WEEK | TIME RANGE | TOOLBAR CONFIG |
|---|---|---|
| MONDAY | 7:00-8:00 | FRENCH1 CLASS |
| MONDAY | 8:00-9:00 | ALGEBRA CLASS |
| MONDAY | 13:00-15:00 | PERIOD1 |
| MONDAY | 19:00-21:00 | MUSIC CLASS |

*Fig. 5*

VISITED - 139D

| DAY OF WEEK | TIME RANGE | VISITED LIST |
|---|---|---|
| MONDAY | 7:00-8:00 | WWW.FRENCH.FE |
| MONDAY | 7:00-8:00 | WWW.TGRY.NET |
| MONDAY | 7:00-8:00 | WWW.LESSON2.ORG |
| MONDAY | 7:00-8:00 | WWW.FRENCH3.COM |
| MONDAY. | 8:00-9:00 | WWW.ALGI.NET |
| MONDAY | 8:00-9:00 | WWW.MATH1.COM |
| MONDAY | 13:00-15:00 | WWW.SOCIAL.COM |
| MONDAY | 13:00-15:00 | WWW.PROF.COM |
| MONDAY | 19:00-21:00 | WWW.GUITAR.COM |

TIME-BASED BROWSER TOOLBAR CONFIGURATIONS ACCORDING TO AT LEAST TWO PREDEFINED TIME-BASED BROWSING SETTINGS

BACKGROUND OF THE INVENTION

1. Field of the Invention

The present invention relates to data-processing. More particularly, the invention relates to configuring browser settings.

2. Background of the Related Art

Computer networks were developed to allow multiple computers to communicate with each other. In general, a network can include a combination of hardware and software that cooperate to facilitate the desired communications. One example of a computer network is the Internet, a sophisticated worldwide network of computer system resources.

Networks, such as the Internet, require a network browser to enable navigation between network addresses. A browser is an application program or facility that normally resides on a user's workstation and which is invoked when the user decides to access network addresses. A prior art Internet browser program typically accesses a given network address according to an addressing format known as a uniform resource locator (URL). The browser also processes each type of data which is presented to it, and forwards and receives data to and from the network. State-of-the-art browsers provide a complete multimedia experience, including video, pictures, 3-D images, sounds and the like.

In addition, browsers provide useful features that facilitate management of the voluminous information encountered by users while browsing. For example, most commercially available Internet browsers (e.g., Netscape's Navigator® and Windows' Explorer®) provide a history folder containing recently visited network addresses (e.g., web sites) and a bookmark folder to which a user can store network addresses for future retrieval.

In order to accommodate the particular preferences of multiple users, some aspects of browsers are customizable. For example, browsers often include one or more toolbars, e.g., personal toolbars which are configurable by the user. Other configurable features include the colors, fonts, display attributes and the like.

The user may configure different browser tool bars and settings to accomplish different tasks. For example, a user may configure a toolbar to display frequently used features such as a "print" button or "email" button and the like. Browsers may also be configured to allow the user to start with a particular default network address (i.e., homepage). These and other configurable settings and features are well known within browsing technology.

In some applications, it is necessary to reconfigure the browser settings numerous times within a given time interval (e.g., in a day). Consider the case where college students are using specific browser settings for a first period French class and different browser settings for a second period Algebra class. For example, the students of the Algebra class may prefer a homepage setting (e.g., www.algebra.com) related to Algebra while the French students prefer a homepage setting related to French (e.g., www.French.com). Because the application of the browser is substantially different, the browser must be manually configured for each class. Currently, the only method or system available to remedy this condition is for each student to manually reconfigure the browser for each class homepage. One option is to use an "options" disk containing user-specific configuration information. Another conventional solution is to cause reconfigurations to occur in response to login information.

However, such options are undesirable because of the possibility for errors in attempting to synchronize some or all of the browser settings and related information and the loss in productivity during the initial configuration process. Therefore, it is desirable to provide time-based browser configuration to suit a particular event environment in a convenient and configurable manner.

SUMMARY OF THE INVENTION

The present invention generally provides a method, article of manufacture and apparatus for establishing time-based browser configurations. In one aspect of the invention, a method is provided for configuring browser settings for a browser program executable on a computer connected to a network of computers, wherein the browser program is configurable according to at least two browser settings, the method comprising configuring the browser program with at least one of the at least two browser settings when a time-value condition is satisfied.

In another aspect of the invention, a signal-bearing media containing a program is provided for configuring browser settings for a browser program executable on a computer connected to a network of computers, wherein the browser program is configurable according to at least two browser settings, the configuration program when executed by a processor, performs a method, comprising configuring the browser program with one or more of the at least two browser settings when a time-value condition is satisfied.

Yet another aspect of the present invention includes a computer system connected to a network of computers, the computer system comprising a processor and a memory containing a browser and at least two browser configuration settings; and a program which, when executed the computer is configured to perform the steps comprising configuring the browser program with at least one or more of at least two browser configuration settings when a time-value condition is satisfied.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 illustrates homepage data records related to a time-based browser configuration.

FIG. 4 illustrates bookmark data records related to a time-based browser configuration.

FIG. 5 illustrates toolbar configuration data records related to a time-based browser configuration.

DETAILED DESCRIPTION OF THE PREFERRED EMBODIMENT

The present invention generally provides a method, article of manufacture and apparatus for establishing time-based browser configurations. As will be described below, aspects of the preferred embodiment pertain to specific method steps implementable on computer systems.

In one embodiment, the invention may be implemented as a computer program-product for use with a computer system. The programs defining the functions of the preferred embodiment can be provided to a computer via a variety of signal-bearing media, which include but are not limited to, (i) information permanently stored on non-writable storage media (e.g., read-only memory devices within a computer such as read only CD-ROM disks readable by a CD-ROM or DVD drive; (ii) alterable information stored on a writable storage media (e.g., floppy disks within diskette drive or hard-disk drive); or (iii) information conveyed to a computer by communications medium, such as through a computer or telephone network, including wireless communication. Such signal-bearing media, when carrying computer-readable instructions that direct the functions of the present invention, represent alternative embodiments of the present invention. It may also be noted that portions of the product program may be developed and implemented independently, but when combined together are embodiments of the present invention.

Figure 1:
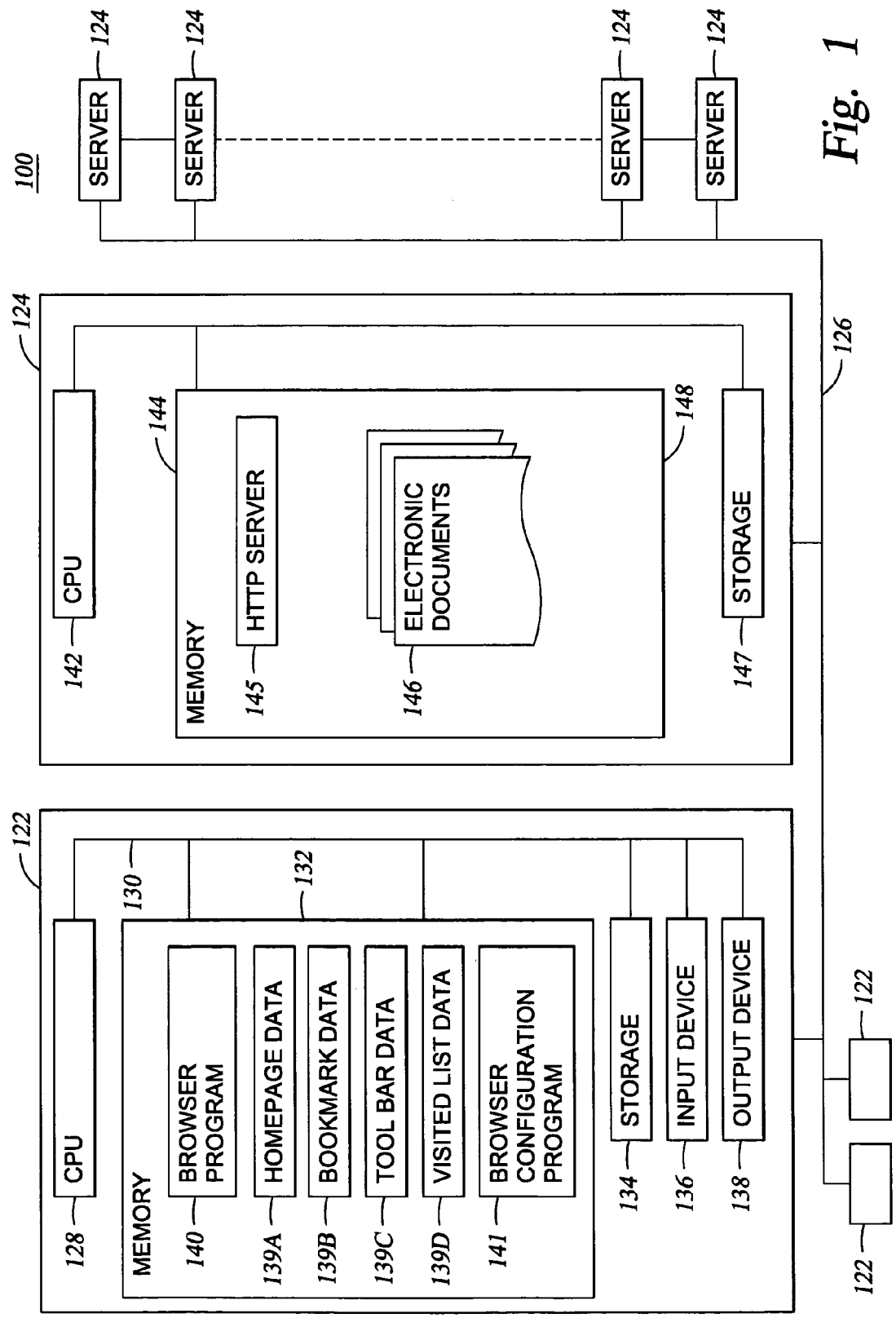
FIG. 1 depicts a data-processing system in which the preferred embodiment may be implemented.

FIG. 1 depicts a data processing system 100 in which the preferred embodiment of the invention may be implemented. In general, the data processing system 100 includes a client (e.g., user's) computer 122 (three such client computers are shown) and at least one server 124 (five such servers 124 are shown). The client computer 122 and the server computer 124 may be the components of the same computer system, or may be connected via a network 126, such as the Internet.

The client computer 122 includes a Central Processing Unit (CPU) 128 connected via a bus 130 to a memory 132, storage 134, input device 136, and output device 138. The input device 136 can be any device to give input to the client computer 122. For example, a keyboard, keypad, light-pen, touch-screen, track-ball, or speech recognition unit, audio/video player, and the like could be used. The output device 138 is preferably any conventional display screen and, although shown separately from the input device 136, the output device 138 and input device 136 could be combined. For example, a display screen with an integrated touch-screen, and a display with an integrated keyboard, or a speech recognition unit combined with a text speech converter could be used.

Memory 132 is preferably random access memory sufficiently large to hold the necessary programming and data structures of the invention. While memory 132 is shown as a single entity, it should be understood that memory 132 may in fact comprise a plurality of modules, and that memory 132 may exist at multiple levels, from high speed registers and caches to lower speed but larger DRAM chips. Memory 132 contains a browser program 140 that, when executed on CPU 128, provides support for navigating between the various servers 124 and locating network addresses at one or more of the servers 124. In one embodiment, the browser program 140 is a web-based Graphical User Interface (GUI), which allows the user to display web pages located on the Internet. Memory 132 also contains a browser configuration program 141 that, when executed on CPU 128, provides support for configuring the browser program settings (e.g., tool bars, homepage, bookmarks, and the like). The browser configuration program 141 can be separate from, or integral to the browser program 140.

Memory 132 also comprises various data structures 139 used by the browser program 140 and browser configuration program 141. Illustratively, memory 132 is shown containing a homepage network address data structure 139A, a bookmark data structure 139B, a toolbar configurations data structure 139C, and a visited network address data structure 139D.

Storage 134 is preferably a Direct Access Storage Device (DASD), although it is shown as a single unit, it could be a combination of fixed and/or removable storage devices, such as fixed disc drives, floppy disc drives, tape drives, removable memory cards, or optical storage. Memory 132 and storage 134 could be part of one virtual address space spanning multiple primary and secondary storage devices.

Each server computer 124 generally comprises a CPU 142, a memory 144, and a storage device 147, coupled to one another by a bus 148. Memory 144 is a random access memory sufficiently large to hold the necessary programming and data structures that are located on the server computer 124. As shown, the memory 144 includes a Hypertext Transfer Protocol (http) server process 145 adapted to service requests from the client computer 122. For example, process 145 may respond to requests to access electronic documents 146 (e.g., HTML documents) residing on the server 124. The http server process 145 is merely illustrative and other embodiments adapted to support any known and unknown protocols are contemplated. The programming and data structures may be accessed and executed by the CPU 142 as needed during operation.

FIG. 1 is merely one hardware configuration for data processing system 120. A preferred embodiment of the present invention can apply to any comparable hardware configuration, regardless of whether the computer system is a complicated, multi-user computing apparatus, a single-user workstation, or network appliance that does not have non-volatile storage of its own.

Figure 2:
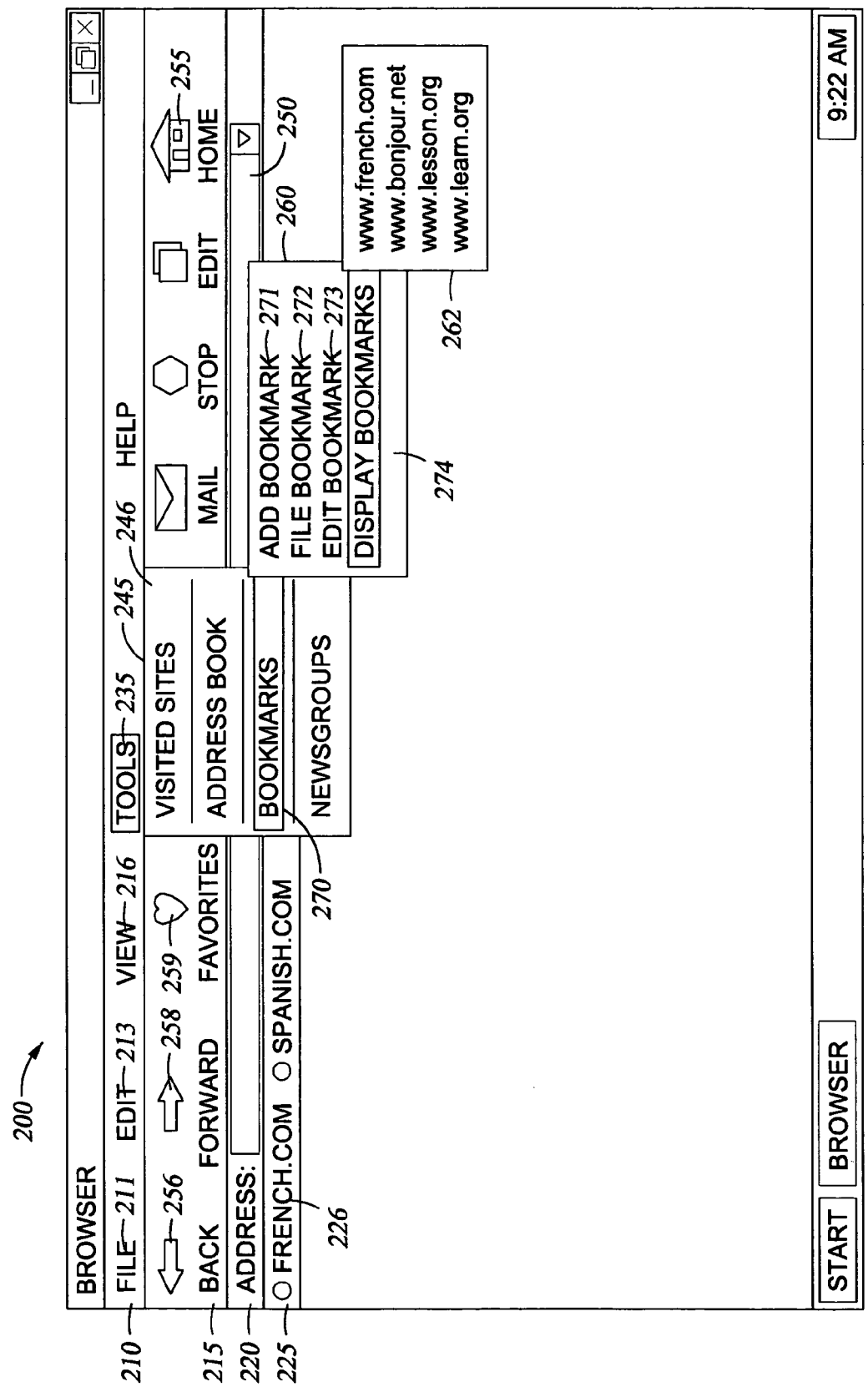
FIG. 2 depicts a browser graphical user interface display screen allowing the user to select the various browser configurations.

FIG. 2 depicts a browser interface 200 integral to the browser program 140 for use with the present invention and may be displayed by the output device 138 (see FIG. 1). In general, browser interface 200 includes features (e.g., radio buttons and check-boxes) for selecting and customizing browser settings, bookmark data, previously visited network addresses, and the like.

A menu toolbar 210 incorporates user file manipulation selections and browser setting selections such as "file" 211, "edit" 213, "view" 216, and the like. A navigation toolbar 215 includes features typically used for navigation such as a "back" button 256 and "forward" button 258 to move backward or forward one or more network addresses previously visited, a "favorites" button 259 to more quickly access specific network addresses, a "home" button 255 to access the homepage network address, and the like. Address toolbar 220 includes an address entry window 221 for entering network addresses to be located and browsed.

User-configurable toolbar 225 incorporates custom browser settings and features. For example, a link to "www-.French.com" 226 may be placed on the user configurable toolbar 225 to allow the user convenient access to that network address. Settings for the user-configurable toolbar 225 are stored in data structure 139C (shown in FIG. 1).

As illustrated in FIG. 2, when the "tools" menu selection 235 of the menu toolbar 210 is accessed (i.e., "pulled down") a pull-down menu 245 appears with sub-windows to display optional browser settings and functions. When "bookmarks" selection 270 has been selected within the pull-down menu 245, a second pull-down menu 260 appears for selecting specific bookmark functions such as "adding" a bookmark 271, "editing" a bookmark 272, "filing" a bookmark 273, and a "display bookmarks" selection 274. When "display bookmarks" selection 274 is accessed, a third pull-down menu 262 appears to display bookmarks stored in data structure 139B. Each item of the "tools" menu 235 may be similarly accessed and may have an associated data structure 139 containing contents specific to that item. For example, the information associated with "visited sites" 246 is contained in data structure 139D.

FIGS. 3–6 depict data structure 139 integral to memory 132 for use with the present invention. Specifically, FIGS. 1–2 are referenced within the following discussion of FIGS. 3–6 as is necessary. Each data structure 139 is organized as a plurality of rows and columns. The columns designate a particular category of information, including a time-valued condition, while each row comprises a record.

FIG. 3 illustrates data structure 139A containing homepage data records. A homepage is a network address established as a "default" address accessed upon activation of the browser program 140, or when the "home" button 255 is selected. Homepage data structure 139A comprises a day of the week entered in column 302, a time-range (i.e., duration) entered in column 304, and associated homepage network address in homepage column 306.

FIG. 4 illustrates data structure 139B containing bookmark data records. Bookmark data provides the user a convenient means of storing and accessing network addresses. For example, a user desiring to return to a particular network address in the future, may store (i.e., bookmark) the address in data structure 139B by selecting the "add bookmark" selection 271 as shown in FIG. 2. Data structure 139B comprises a specific day of the week column 402, time-range 404, and associated network address in column 406.

FIG. 5 illustrates data structure 139C containing toolbar configuration data records associated with the standard toolbar 210, the navigational toolbar 215, the address toolbar 220, and the user configurable toolbar 225. Data structure 139C comprises a day of the week column 502, time-range column 504, and toolbar settings column 506.

Figures 6, 8:
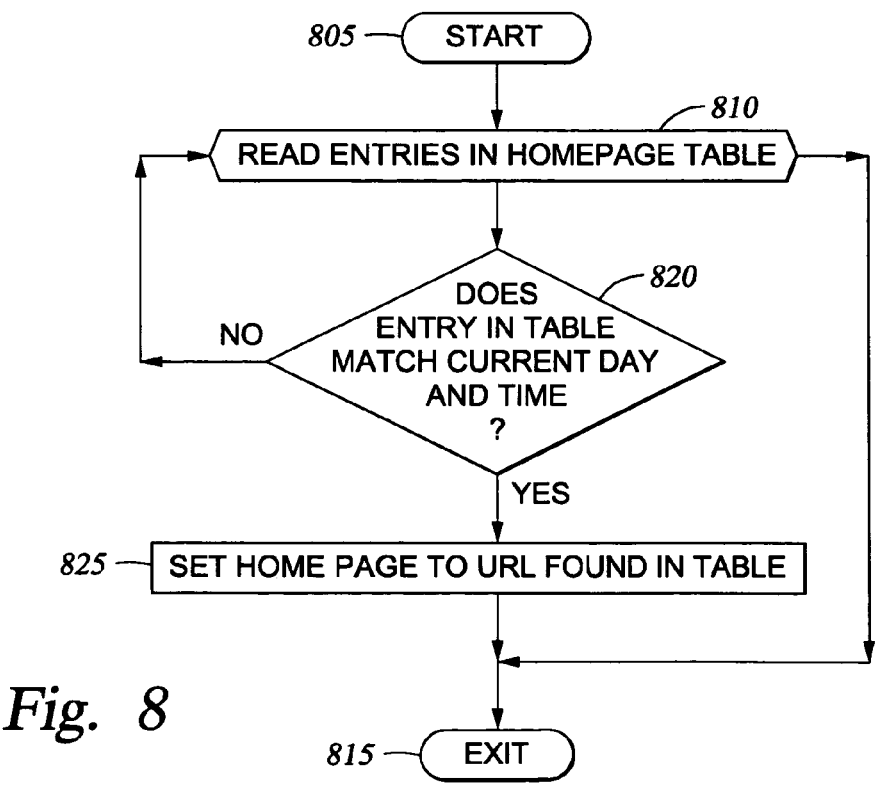
FIG. 6 illustrates visited network address data records related to a time-based browser configuration.
FIG. 8 depicts a flow diagram of a method for rendering a time-based homepage record.

FIG. 6 illustrates data structure 139D containing visited network address data records. Data structure 139D comprises a day of the week column 602, a time-range column 604, and an associated network address within visited sites column 606.

Figure 7:
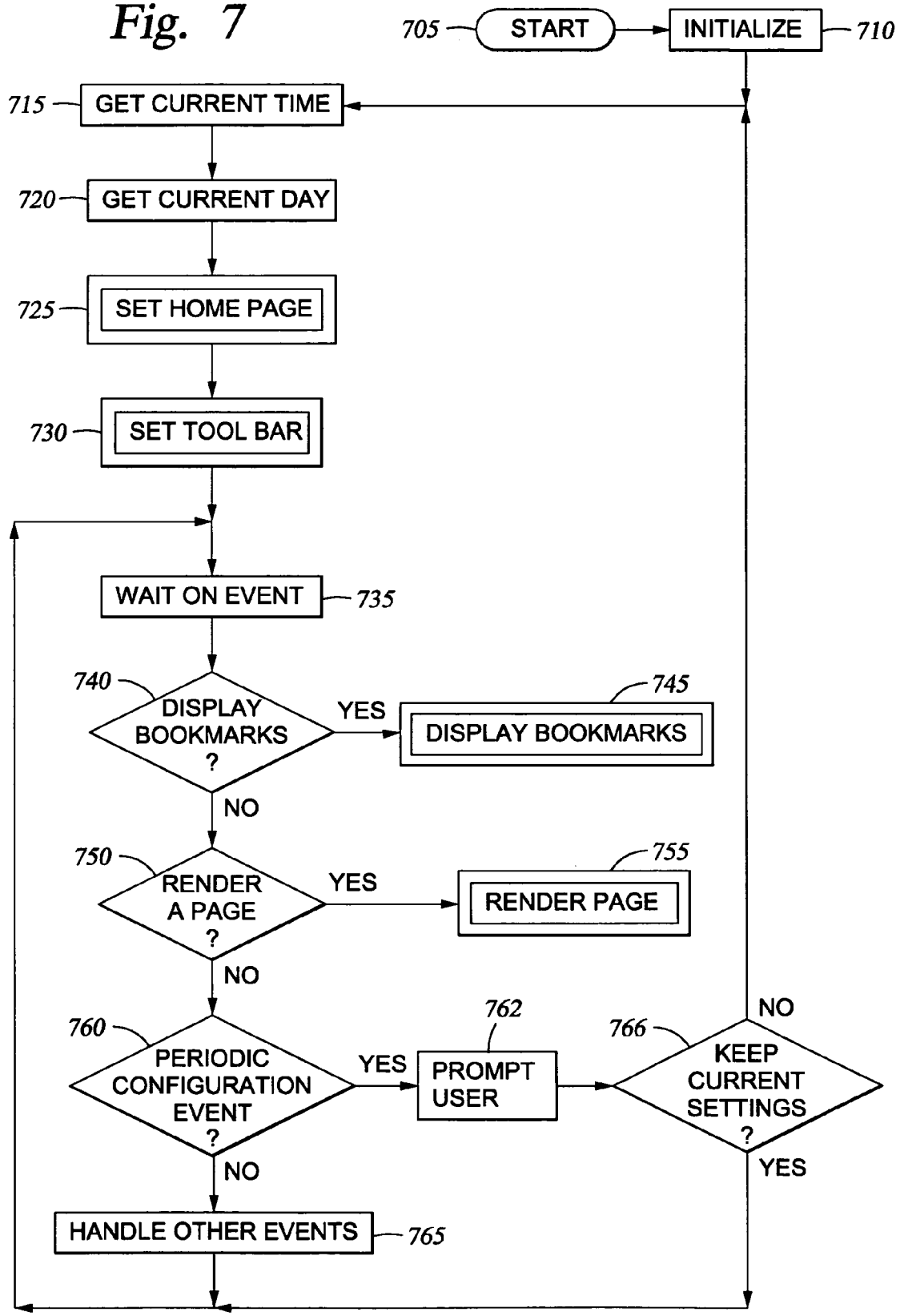
FIG. 7 depicts a flow diagram of a method for configuring time-based browser settings.

FIG. 7 depicts a flow diagram of a method 700 for configuring settings of a browser program 140 using a browser configuration program 141. As necessary, FIGS. 1–6 are referenced in the following discussion of FIG. 7.

FIG. 7 is entered into at step 705 when the browser program 140 and browser configuration program 141 are activated. At step 710, the browser configuration program 141 is initialized and method 700 proceeds to step 715. At step 715, method 700 acquires the current time of day. At step 720, method 700 acquires the current day.

At step 725, method 700 retrieves a homepage data record from data structure 139A associated with the current day and time of day and configures the browser program 140 to the homepage data record. One embodiment of a method 800 for configuring the browser program 140 to a homepage data record is illustrated below with reference to FIG. 8.

At step 730, method 700 retrieves a toolbar data record from data structure 139C associated with the current day and time of day. Subsequently, method 700 configures the browser program 140 to the toolbar data record.

At step 735, method 700 receives browser program events. At step 740, method 700 determines whether the event is for displaying bookmark data. For example, a user selects the "display bookmarks" selection 274. If the event is not displaying bookmark data, then method 700 proceeds to step 750 described below. If the event is displaying bookmarks, then method 700 proceeds to step 745 to display bookmarks available from bookmark data structure 139B associated with the current day and time of day.

At step 750, method 700 determines whether the event is for rendering a page (e.g., web page). If the event is not to render a page, then method 700 proceeds to step 760 described below. If the event is to render a page, then method 700 proceeds to step 755 to render the page.

At step 760, method 700 determines if the event is to configure the browser to the appropriate settings for the current day and time of day. If not, then method 700 proceeds to step 765 to handle other events. If so, the browser proceeds to step 762 described below. At step 762, method 700 issues a query to the user via output device 138 asking if the current settings are correct (e.g., a query window). At step 766, if the user answers the query affirmatively, method 700 proceeds to step 735 to wait for the next event. If the user indicates that the settings are not correct, or if the user does not respond within a predetermined length of time, method 700 proceeds to step 715 to reconfigure the browser program to the settings associated with the current day and time of day. Thus, method 700 allows a user to maintain the current periodic browser settings even if the periodic interval has elapsed.

For example, assume method 700 is set to reconfigure the browser program 140 for a first period French class at 7:00 AM and reconfigure the browser settings for a second period Algebra class at 8:00 AM. Consider now, a first period French student who decides to continue using the browser program settings beyond the French class period, until the second period Algebra student arrives. Thus, at the start of the Algebra class at 8:00 AM, the French student continues to use the browser program settings associated with the French Class. At 8:00 AM, a configuration event is provided. At step 760, method 700 determines the event is a reconfiguration and proceeds to step 762. At step 762, method 700 issues a query via output device 138 to the French student asking if the current settings are valid. At step 766, the French student can answer affirmatively (e.g., "yes") and continue using the French class settings. If so, method 700 then proceeds to step 735 to wait for the next event. If not, method 700 proceeds to step 715 to configure the settings for the Algebra class. If the French student does not answer the query at step 766 within a predetermined length of time, method 700 proceeds to step 715 to configure the settings for the Algebra class.

If the French student keeps the settings until the Algebra student arrives, the browser program 140 may be reconfigured to the Algebra class settings, either by a user-issued command, or by method 700 when a predetermined period of inactivity has elapsed.

In one embodiment, when the current settings being used differ from what the current period specifies, the program 141 prompts the user after a predetermined length of time to check if the current settings are still valid. If so, the program waits to prompt the user. If not, the method 700 configures the settings associated with the current period. For example, while the French student is using the French settings during the Algebra period, method 700 will periodically query the French student to verify that the current settings are valid.

FIG. 8 depicts a flow diagram of a method 800 for configuring a time-based homepage. As necessary, FIGS. 1–7 are referenced in the following discussion of FIG. 8.

FIG. 8 is entered into at step 805 from step 725 (see FIG. 7). At step 810 method 800 reads a first homepage data record from data structure 139A including the time-range and day. At step 820, method 800 determines whether the current day, and time of day, is within the first homepage data record time-range and day acquired from step 810. If not, then method 800 proceeds to step 810 to read the next homepage data record. Method 800 loops between step 810 and 820 until a matching homepage data record is found, or all homepage data records are read. If method 800 finds a matching homepage data record, method 800 proceeds to step 825 to set the browser to the matching homepage data record. Subsequently, method 800 proceeds to step 815. If there are no homepage data records matching the day and time of day, then method 800 proceeds to step 815 exiting back to step 725.

Figure 9:
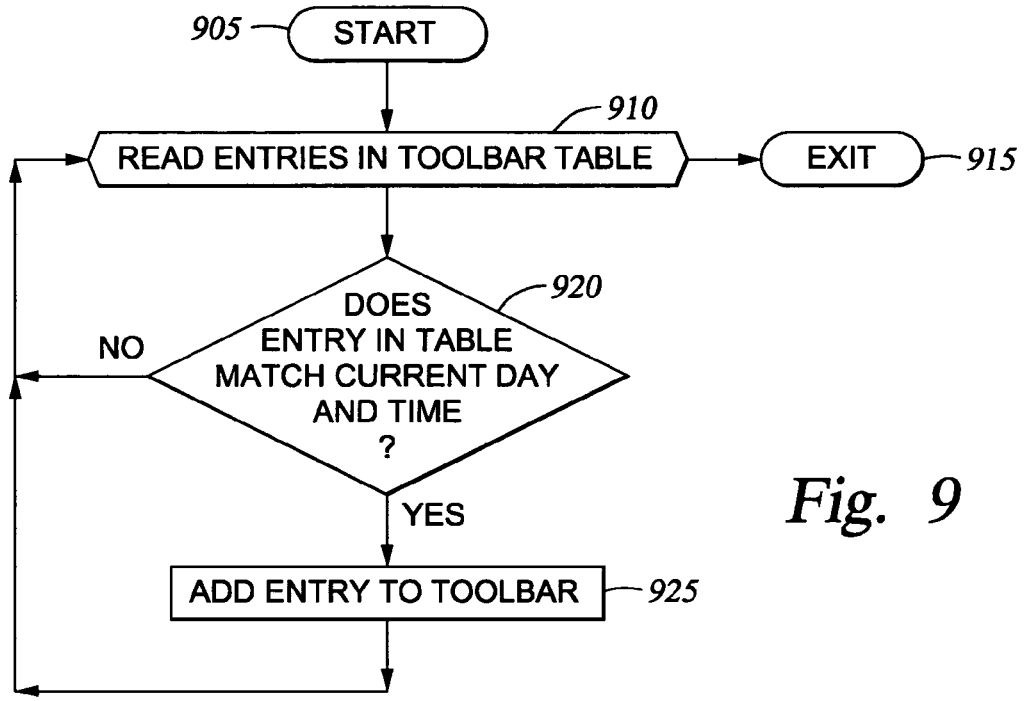
FIG. 9 depicts a flow diagram of a method for configuring time-based toolbar settings.

FIG. 9 depicts a flow diagram of a method for configuring time-based toolbar settings. FIG. 9 is entered into at step 905 from step 730 (see FIG. 7). At step 910 method 900 reads a toolbar data record from data structure 139C. At step 920, method 900 determines whether the current day and time of day is within the toolbar data record time-range, and day, acquired from step 910. If the toolbar data record does not match the time-range and day, then method 900 proceeds to step 910 to read the next data record. Upon finding a matching toolbar data record, method 900 proceeds to step 925. At step 925, method 900 sets the browser settings corresponding to the toolbar data record, then proceeds to step 910 to read the next data record. Method 900 loops between step 910 and 920 until all matching toolbar data records are found, or until all toolbar data records have been read. If no matching records are located, method 900 proceeds from step 920 to step 915 and exits to step 735.

Figure 10:
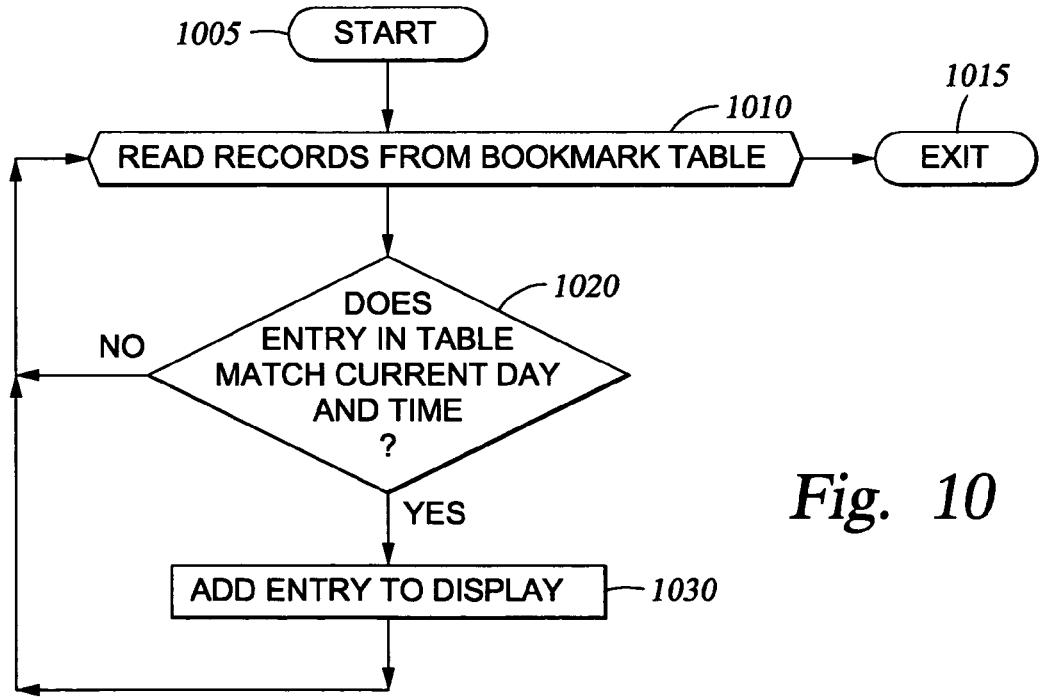
FIG. 10 depicts a flow diagram of a method for configuring time-based bookmark data.

FIG. 10 depicts a flow diagram of a method for configuring time-based bookmark data. FIG. 10 is entered into at step 1005 from step 740 (see FIG. 7). At step 1010, method 1000 gets a bookmark data record from data structure 139B.

At step 1020, method 1000 determines whether the current day, and time of day, is within the bookmark record time-range, and day, acquired from step 1010. If the bookmark record does not match the day, and time of day, then method 1000 proceeds to step 1010 to read the next bookmark data record. Method 1000 loops between step 1010 and 1020 until all matching bookmark data records are found, or until all bookmark data records are read. During each loop, if method 1000 determines that a matching bookmark data record is found, method 1000 proceeds to step 1030. At step 1030, method 1000 configures the browser to allow the user access to the bookmark data record (e.g., displaying the bookmarks in window 262) and returns to step 1010 to read the next data record. After all of the bookmark data records have been read, method 1000 exits to step 745.

Figure 11:
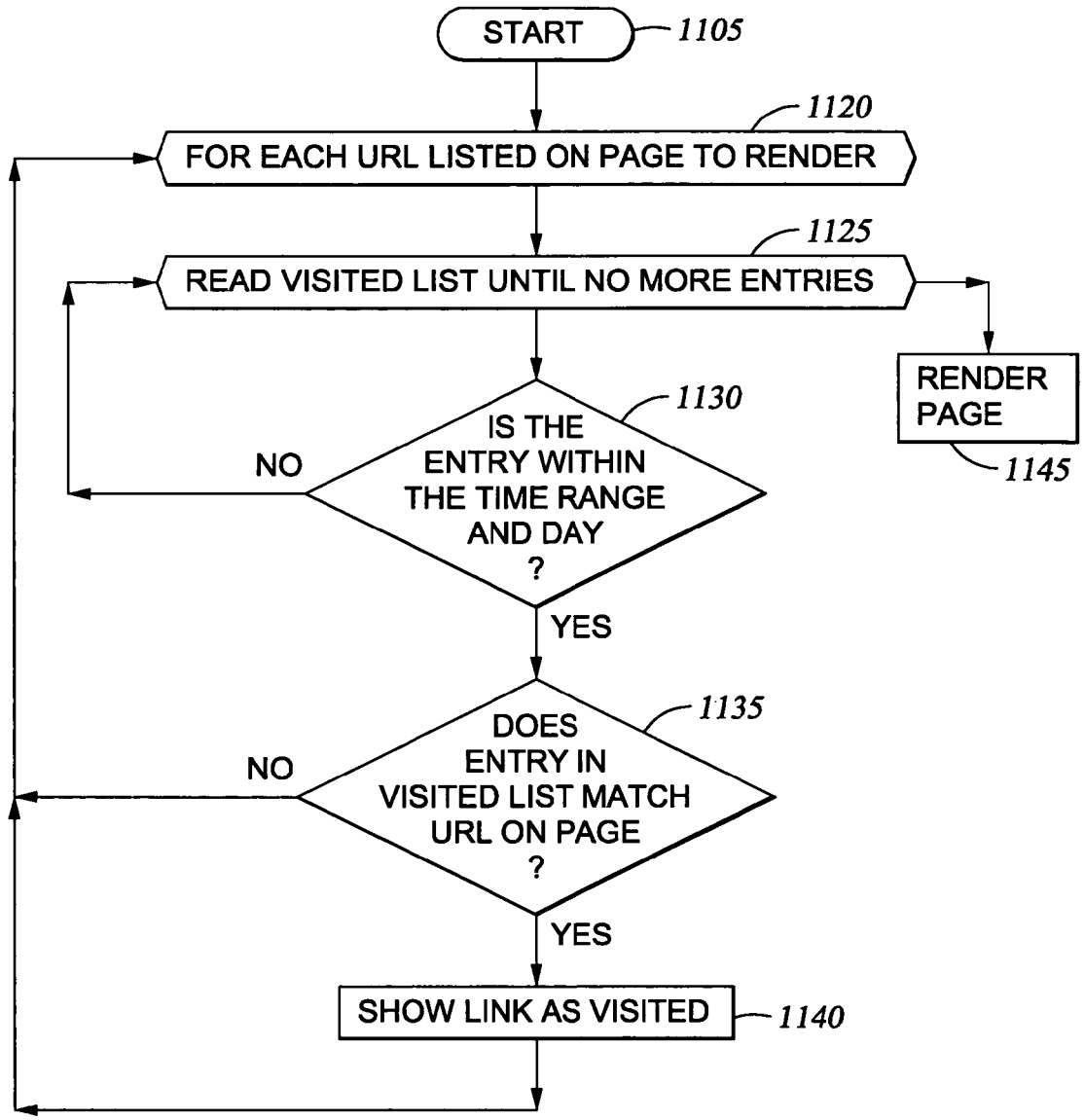
FIG. 11 depicts a flow diagram of a method for marking network address links visited during a particular day, and time of day, on a currently rendered page.

FIG. 11 depicts a flow diagram of a method for marking network address links visited during a particular day, and time of day, on a currently rendered page. FIG. 11 is entered into at step 1105 from step 755 (see FIG. 7). Marking the network address as "visited" may be done by changing the color of the link, underlining the link, italicizing the link, and the like.

At step 1120, method 1100 receives the HTML information from the current network address electronic document 146 containing links to other network addresses. Method 1100 proceeds to step 1125 and acquires a visited data record from data structure 139D. At step 1130, method 1100 determines whether the visited data record matches the current day, and time of day. If not, method 1100 proceeds to step 1125. If a matching record is found method 700 proceeds to step 1135 to determine whether or not the visited data record matches a network address link obtained from step 1120. If not, method 1100 proceeds to step 1120 to obtain another link. If so, method 700 proceeds to step 1140 and marks the network address as visited and then returns to step 1120. Method 1100 loops between steps 1120 and 1140 until all of the network addresses matching the day and time of day have been compared to the visited list at step 1135 and marked at step 1140. At step 1125, after all of the visited data records are read, the method proceeds to step 1145 and renders the electronic document 146 to the user with the previously visited network addresses marked as "visited."

FIGS. 7–11 are merely illustrate methods for configuring selected features of a browser program 140. The invention contemplates configuring any aspect of the browser program 140 with established time-value conditions.

Although various embodiments which incorporate the teachings of the present invention have been shown and described in detail herein, those skilled in the art can readily devise many other varied embodiments within the scope of the present invention. For example, the present invention has been primarily described within the context of time-based browser configurations, established from methods 700–1100 for a specified periods of time such as a day and time of day. In one embodiment, the time-interval may be any interval of time.

In another embodiment, method 700 allows for manual reconfiguration to any period. For example, the Algebra student wishes to use the Algebra settings at other times. Consider then case where an Algebra student has an 8:00 AM class but decides to do extra credit work at 11:00 PM. When the Algebra student arrives at 11:00 PM, assume the current browser settings for 11:00 PM are set for an "open study" period. When the Algebra student selects the "8:00 AM" configuration, then method 700 configures the browser settings for 8:00 AM, the Algebra class settings.

In one embodiment, the data structures 139 are located on the server 124 and made accessible to the browser program 140 and configuration program 141 residing on client 122. This allows the browser configurations to be portable and available to a plurality of browsers via the network 126. In addition, the individual contents of 139 may be distributed within the network 126 between client components and server components. For example, the time-value condition may be stored on the server 124 while the browser configuration information is stored on the client 122. When the time-valued condition is satisfied, the server 124 transmits an appropriate control message to the client 122 to indicate which configuration should be loaded.

In another embodiment, some of the steps are performed by separate programs in cooperation with the browser program 140 and configuration program 141. The separate programs may be located on the client 122 or distributed within the network 126.

In one embodiment, the periodic configuration event and length of the event are issued by a user. For example, assume a French Class is rescheduled to a different period. During the rescheduled period, the instructor of the French class sends a configuration event to all of the client computers 122 used for the class, via the network 126. The event specifies the French class settings for a specified length of time. Upon receiving the event, all of the computers 122 configure to the French class for the specified length of time.

While the foregoing is directed to the preferred embodiment of the present invention, other and further embodiments of the invention may be devised without departing from the basic scope thereof, and the scope thereof is determined by the claims that follow.

What is claimed is:

1. A method for configuring a browser program executable on a computer connected to a network of computers, wherein the browser program is configurable according to at least two predefined time-based browser settings, the method comprising:

providing a different predetermined time-value for each of the at least two predefined time-based browser settings;

determining whether either of the different predetermined time-values is satisfied with respect to a current time; and if so, configuring the browser program with one of the at least two browser settings corresponding to the satisfied predetermined time-value; wherein the one of the two browser settings comprises at least one browser toolbar configuration and wherein the toolbar configuration comprises at least one configuration selected from a group consisting of a standard toolbar, a navigation tool bar, an address tool bar, and a user-defined toolbar.

2. The method of claim 1, wherein the predetermined time-values are user-defined.

3. The method of claim 1, wherein the predetermined time-values are a day and time of day.

4. The method of claim 1, wherein the one of the at least two browser settings comprises a setting for at least one previously visited network address accessed by the browser program.

5. The method of claim 4, after configuring the browser program, further comprising:

receiving at least one electronic document containing at least one network address;

determining whether the network address within the electronic document is the at least one previously visited network address; and if so, rendering the electronic document in a manner indicating the network addresses within the document as being visited.

6. The method of claim 4, wherein the network addresses are stored as bookmarks.

7. A signal-bearing medium containing a program for configuring a browser program executable on a computer connected to a network of computers, wherein the browser program is configurable according to at least two predefined time based browser settings, the configuration program when executed by a processor, performs an operation, comprising:

providing a different predetermined time-value for each of the at least two predefined time-based browser settings;

determining whether either of the different predetermined time-values is satisfied with respect to a current time; and if so, configuring the browser program with one of the at least two browser settings corresponding to the satisfied predetermined time-value; wherein the one of the two browser settings comprises at least one browser toolbar configuration and wherein the toolbar configuration comprises at least one configuration selected from a group consisting of a standard toolbar, a navigation toolbar, an address toolbar, and a user-defined toolbar.

8. The signal-bearing medium of claim 7, wherein the predetermined time-values are user-defined.

9. The signal-bearing medium of claim 7, wherein the predetermined time-values are a day and time of day.

10. The signal-bearing medium of claim 7, wherein the one of the at least two browser settings comprises a setting for at least one previously visited network address accessed by the browser program.

11. The signal-bearing medium of claim 10, after configuring the browser program, further comprising:

receiving at least one electronic document containing at least one network address;

determining whether the network address within the electronic document is the at least one previously visited network address; and if so, rendering the electronic document in a manner indicating the network addresses within the document as being visited.

12. The signal-bearing medium of claim 10, wherein the network addresses are stored as bookmarks.

13. A Web browser resident in memory, comprising:

a plurality of time-based browser settings;

a plurality of predetermined time-values, wherein each of the plurality of predetermined time-values corresponds to one of the plurality of time-based browser settings; and configuration code for configuring the browser with each of the plurality of time-based browser settings when the corresponding predetermined time-value is satisfied by a current time; wherein at least one of the plurality of time-based browser settings comprises a browser toolbar configuration and wherein the toolbar configuration comprises at least one configuration selected from a group consisting of a standard toolbar, a navigation toolbar, an address toolbar, and a user-defined toolbar.

14. The Web browser of claim 13, wherein the each of the plurality of time-based browser settings specifies a different previously visited network addresses file.

15. The Web browser of claim 13, wherein the each of the plurality of time-based browser settings specifies a different bookmark file.

16. The Web method of claim 13, wherein the each of the plurality of time-based browser settings specifies a different homepage network address.

17. A method of configuring a browser differently based on a current time, comprising:

upon launching the browser, loading a first set of browser configuration settings based on a determination of the current time; and after the expiration of some time, loading a second set of browser configuration settings based on a determination of the current time; wherein at least one of the first and second sets of browser settings comprises at least one browser toolbar configuration and wherein the toolbar configuration comprises at least one configuration selected from a group consisting of a standard toolbar, a navigation toolbar, an address toolbar, and a user-defined toolbar.

18. The method of claim 17, wherein the first set of browser configuration settings has an associated first time value and the second set of browser configuration settings has an associated second time value different from the first time value, and wherein the loading is performed when the respective time values satisfy the current time.

19. The method of claim 17, wherein the first and second sets of browser configuration settings specify different home page network addresses.

* * * * *